Figure 1:
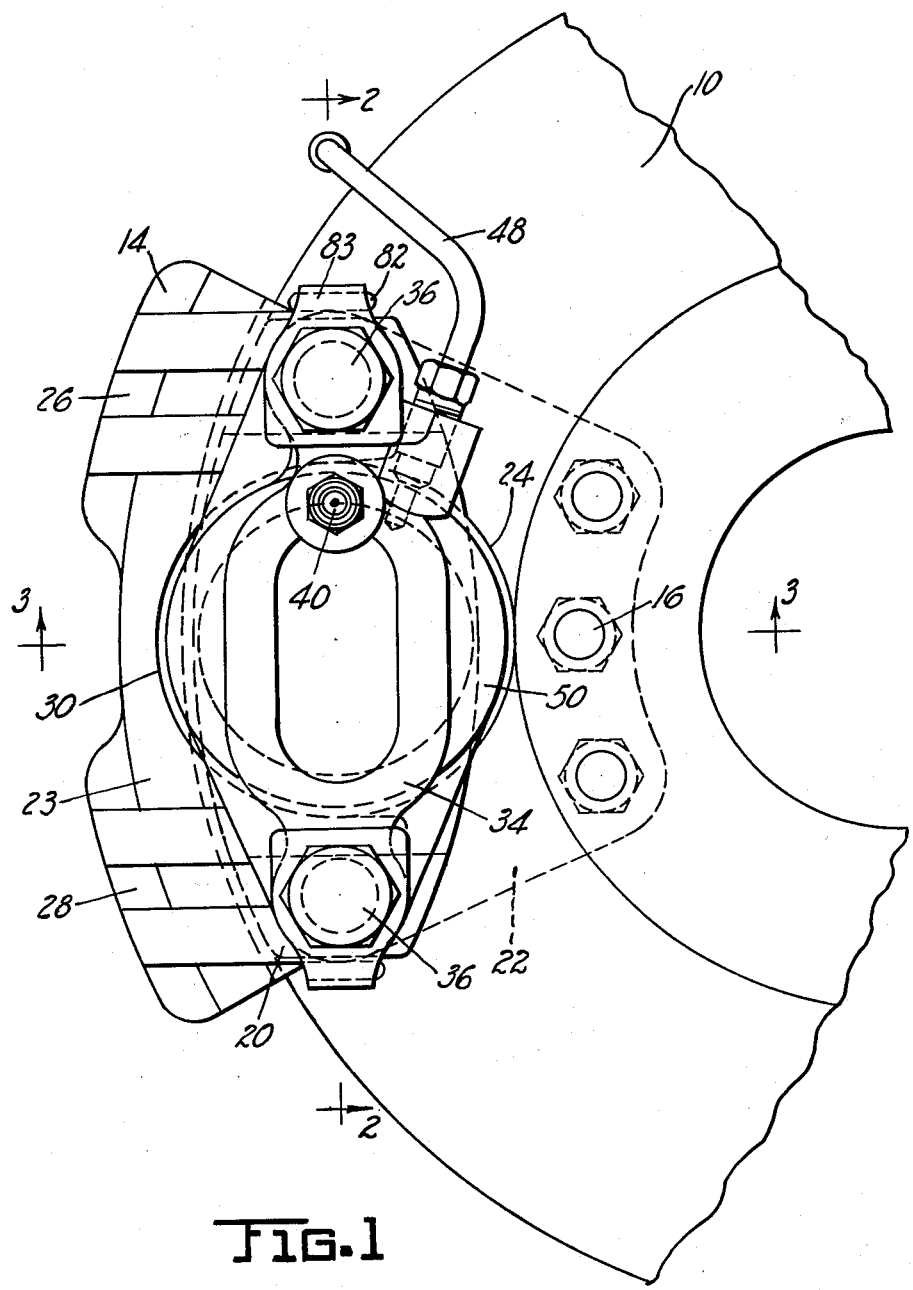

Aug. 1, 1961    R. T. BURNETT    2,994,410
DISK BRAKE
Filed Jan. 27, 1958    4 Sheets-Sheet 1

INVENTOR.
RICHARD T. BURNETT
BY John A. Young
ATTORNEY

Aug. 1, 1961 R. T. BURNETT 2,994,410
DISK BRAKE
Filed Jan. 27, 1958 4 Sheets-Sheet 2

INVENTOR.
RICHARD T. BURNETT
BY John A. Young
ATTORNEY

Aug. 1, 1961 R. T. BURNETT 2,994,410
DISK BRAKE

Filed Jan. 27, 1958 4 Sheets-Sheet 3

INVENTOR.
RICHARD T. BURNETT
BY John A. Young
ATTORNEY

Aug. 1, 1961 R. T. BURNETT 2,994,410
DISK BRAKE

Filed Jan. 27, 1958 4 Sheets-Sheet 4

INVENTOR.
RICHARD T. BURNETT
BY John A. Young
ATTORNEY

United States Patent Office 2,994,410
Patented Aug. 1, 1961

2,994,410
DISK BRAKE
Richard T. Burnett, South Bend, Ind., assignor to The Bendix Corporation, a corporation of Delaware
Filed Jan. 27, 1958, Ser. No. 711,299
12 Claims. (Cl. 188—73)

This invention relates to disk brakes and more particularly to that type of disk brake referred to as a "caliper" disk brake in which the stationary housing of the brake straddles the periphery of a rotating disk and provides a supporting member or "limb" on each side of the rotating disk in fixed axial relation thereto.

In the so-called caliper constructions the friction pads need to be guided as they move laterally into and out of engagement with the rotor surface. Various methods have been proposed to accomplish this guiding. One method is to mount the friction pads in the cylinder bore. Another method is to notch out the limbs sufficiently to receive the friction pads and allow slidable movement thereon. Among other deficiencies, both these methods seriously limit the shape of the friction pad.

Another problem which has arisen with the "caliper" construction is providing a satisfactory means to allow the friction pad to conform throughout its entire area with the opposing rotor surface, owing to a tendency for wear to occur unevenly to a minor degree on the friction pad. Means must therefore be devised to permit the friction pad to tip slightly in all directions in order to conform to the opposing surface. The various structures (with which I am acquainted) that purport to accomplish this conformable contact, have not proven entirely satisfactory for various reasons.

It is one of the foremost objects of the present invention to provide a caliper construction in which the anchoring and lateral guiding afforded the friction pads will provide greater latitude in the choice of structures for the friction pad and further improve the anchoring and lateral guiding of said friction pads.

A further feature of the present invention is to "build up" the caliper structure from separate housing, fluid motor actuator and wear pad, and provide that the fastening means for holding these components together will further function as the anchoring means for the friction pad.

The structural arrangement proposed is especially advantageous from a brake service (repair or replacement) standpoint since the friction pad can be easily removed without disturbing the hydraulic connections of the actuator.

In accomplishing these foregoing objects it has been further possible to provide a brake structure which is lightweight, compact (sufficient to fit in the limited space provided in present day vehicle wheels) and rugged in performance.

Figure 2:
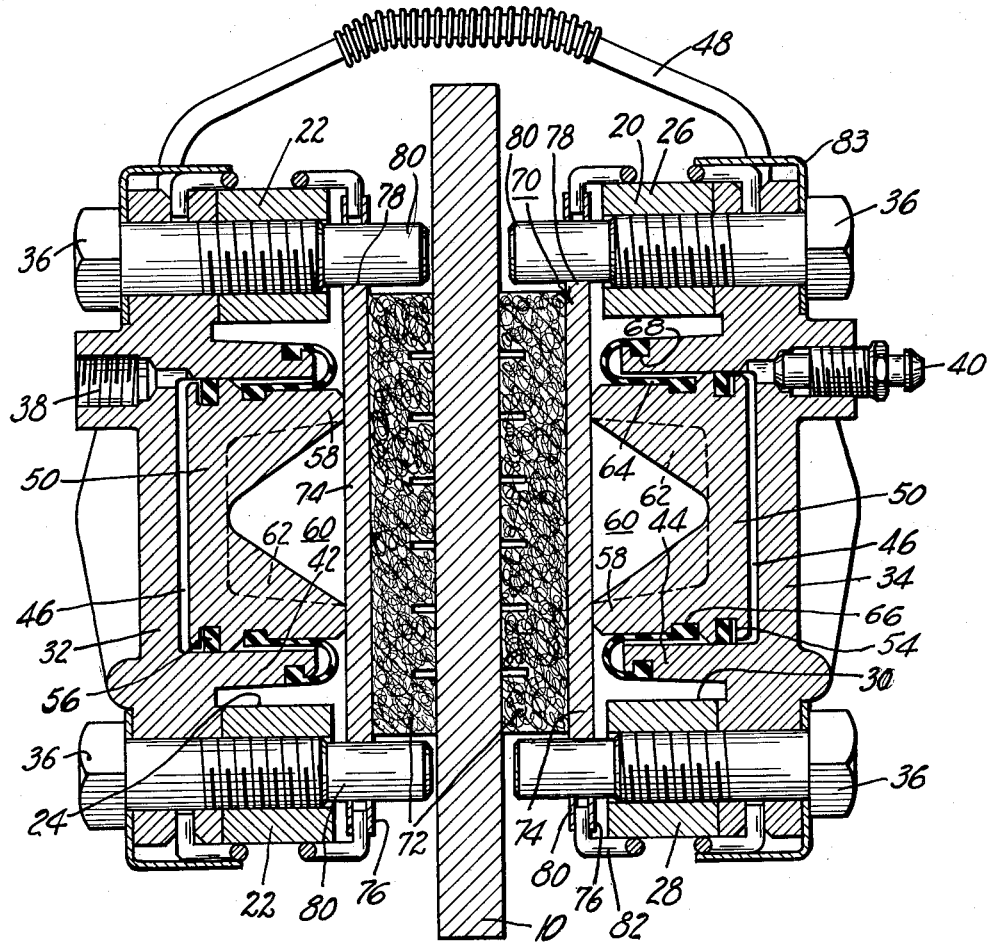
Figure 3:
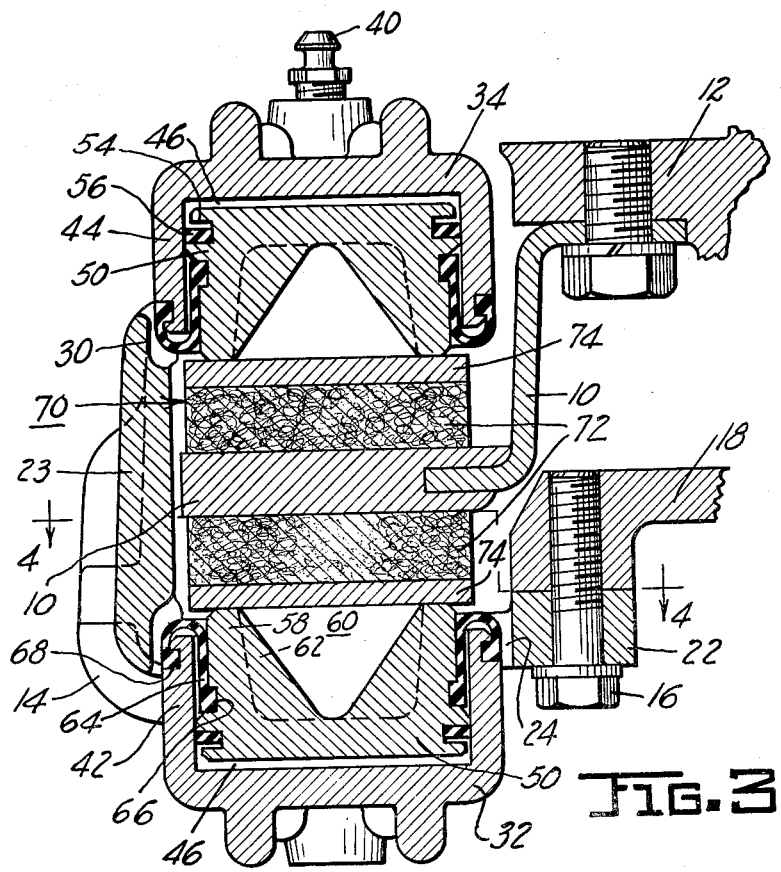
Figure 5:
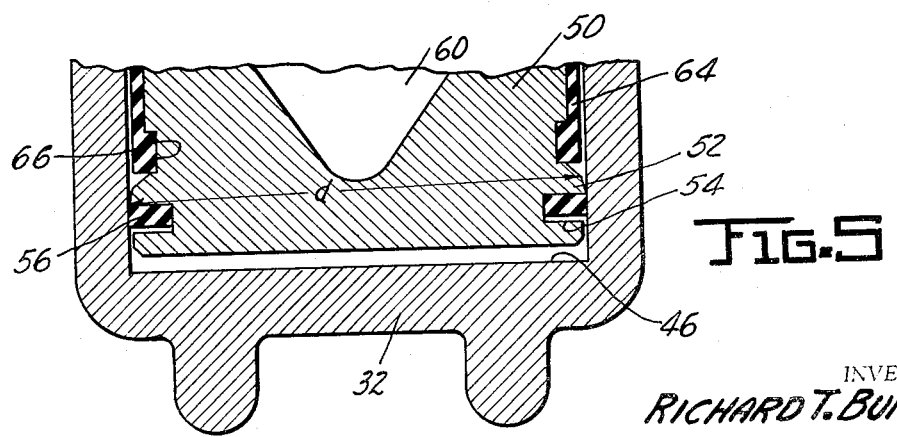
Figure 4:
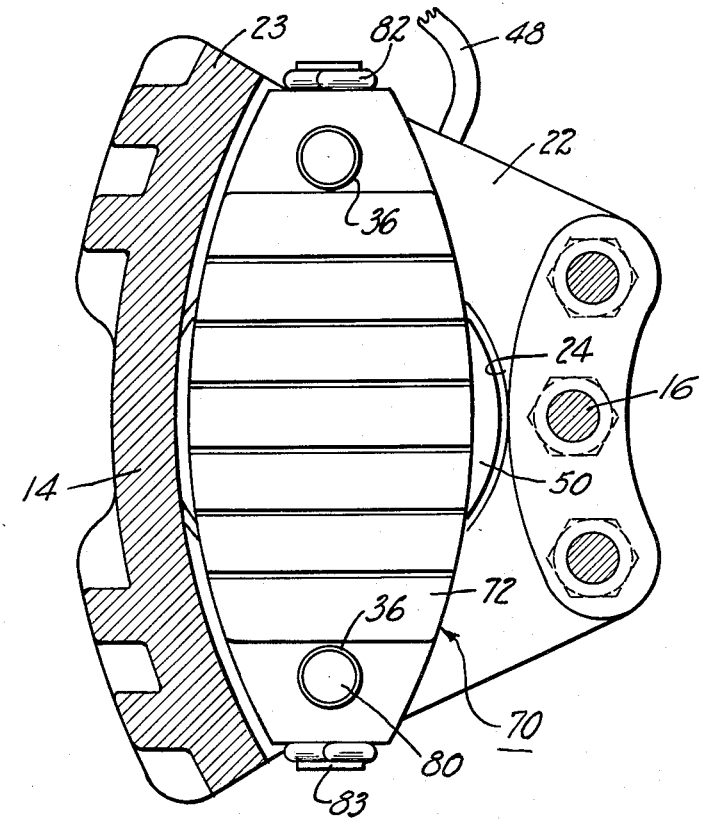

Other objects and features of the invention will become apparent from a consideration of the following description which proceeds with reference to the accompanying drawings, wherein:

FIGURE 1 is a plan view of a brake constructed according to my invention;

FIGURES 2 and 3 are sectional views of the brake shown in FIGURE 1 taken along the lines 2—2 and 3—3, respectively of FIGURE 1;

FIGURE 4 is a sectional view of the brake taken along the line 4—4 of FIGURE 3; and FIGURE 5 is an enlarged partial section of the piston and cylinder housing shown in FIGURE 3.

Referring now to FIGURES 1, 2 and 3, an annular disk 10 is secured at its inner periphery to a rotatable part of a vehicle wheel 12. A stationary housing or caliper, designated generally by the reference numeral 14, is secured by bolts 16 to a non-rotatable part 18 of the vehicle wheel assembly. The housing 14 straddles the outer periphery of the disk 10 and provides on each side of the disk supporting members or limbs 20 and 22. Integral with and interconnecting the limbs 20 and 22 beyond the periphery of the disk 10 is a portion 23 of the housing 14 (FIGURE 3). A circular opening or recess 24 is provided in the caliper limb 22. The limb 20 of the caliper extends only partially radially inward and consists of two radially inwardly projections 26 and 28 and a semi-circular center recess 30.

Secured to the limb 22 of the caliper is a fluid motor housing 32, and secured to the radial projecting portions 26 and 28 of limb 20 is a similar fluid motor housing 34. The two housings 32 and 34 are each secured to their respective caliper limbs by means of bolts 36, which also serve a further function to be hereinafter described. The housing 32 is provided with an inlet port 38 which is threaded for connection to a source of fluid pressure (not shown). The housing 34 is provided with a bleeder valve 40.

Each of the housings 32 and 34 have axially extending portions 42 and 44, respectively, which are received in the circular recess 24 of limb 22 and the recess 30 of limb 20, respectively. In each of the axially extending portions 42 and 44 of the fluid motor housings is a cylinder bore 46. Each of the cylinders provides a fluid chamber which is interconnected by means of the tubing 48.

Received and slidable in each of the cylinders is a piston 50. Each of the pistons 50 has a relatively narrow land 52 (FIGURE 5) bearing against the cylinder wall. The remainder of the piston is of a reduced diameter which does not contact the walls of the cylinder. At the rear of the narrow land 52 of each of the pistons is an annular groove 54 in which is received an annular seal 56. In the operative end 58 of each of the pistons 50 there is a hollow recess 60 providing an air space therein. To strengthen the piston the ribs 62 are formed in the hollow recess 60. To prevent dirt and other foreign matter from entering into the fluid chambers a resilient annular boot 64 is received in a groove 66 in the reduced diameter portion of the piston, and the boot 64 is secured at its other end in an annular groove 68 formed on the axially extended portions 42 and 44 of the fluid motor housings 32 and 34.

The piston construction above described permits the piston to "tilt" or "rock" within the cylinder bore. To permit the piston to so rock, it is necessary that the diagonal dimension "d" (FIGURE 5) from corner to corner of the narrow land of the piston be slightly less than the diameter of the cylinder bore. This permits the piston to move any angular amount within the cylinder, this angular movement being limited only by the forward end of the piston which will strike the sides of the cylinder bore when the piston is rocked to a substantial number of degrees. The same results of permitting the piston to rock within the cylinder can also be accomplished by rounding the narrow land bearing surface of the piston. However, I prefer the construction first described because the flat surfaces are easier to machine than are the rounded surfaces.

The end 58 of each of the pistons 50 is flat and each end abuts against a substantially oval shaped wear pad 70 which consists of a pad of friction material 72 suitably secured to a metal backing plate 74.

I prefer to make the friction pad 72 and the backing plate 74 of a somewhat oval shape (FIGURE 4), although other shapes of wear pads may be utilized in my invention without affecting the operation thereof. The backing plate 74 extends longitudinally beyond the ends of the friction pad providing extension portions 76 in which are drilled holes 78. A non-threaded extended portion 80 of the bolts 36, which secure the fluid motor housings to the caliper limbs, are received in the holes 78. The extended portions 80 of the bolts 36 are in fixed axial relation to the disk 10 and are provided with sufficient clearance therefrom so as not to interfere with the rotation of the disk. The extended portions 80 of the bolts 36 serve as anchors for the wear pads 70 and limit movement of the wear pads to an axial direction.

It is now obvious that the bolts 36 serve a multipurpose. Not only are they the means for securing the fluid motor housings to the caliper limbs, but they also serve as anchors and guides for the friction pads. By using the bolts which secure the fluid motor housings to the caliper limbs also as anchors for the friction pads, it is not necessary to provide separate pins as anchors for the shoes. This permits both the caliper and fluid motor housings to be of a reduced size since it is no longer necessary to provide both pins and bolts for the brake. Since these bolts are the sole anchoring means for the wear pads and since there is no direct interconnection between the wear pads and the pistons, little or none of the torque developed during braking is carried through the piston and cylinder walls but rather is carried directly to the housing and from there to the non-rotatable part of the wheel assembly through the bolts 16.

To maintain the piston and wear pads in abutting relation at all times, I provide a combination adjuster and retractor spring 82 for each end of each of the wear pads. These springs are each held in place by a retaining member 83 which is secured to the housing 32 or 34 by bolts 36. Construction and operation of these combination adjuster and retractor springs is more fully described in copending application Serial No. 645,715, filed March 13, 1957, and does not constitute part of the invention herein.

To more fully bring out the novel features of my invention, the operation of the brake and the mode of servicing the brake will now be described. In operation, fluid under pressure is introduced to the actuators from a master cylinder source (not shown) through the inlet port 38 of housing 32 and therefrom through the tubing 48 which interconnects the two fluid actuators so that the two pistons are applied concurrently. Fluid pressure introduced into the cylinders causes the pistons to move axially inward, which in turn moves the wear pads 70 axially toward each other and into frictional engagement with the rotating disk. If upon initial application of the brakes or at any time during the life of the wear pads they do not fully conform with the rotating disk end, the pistons 50 will rock or tilt within the cylinders and permit the friction pads to be in full conformance with the surfaces of the disk while still maintaining full contact between the pistons and the wear pads. It should be noted that in my invention I obtain full utilization of the surface area of the operative end of the piston so that the applying effort exerted by the pistons is substantially distributed over a large area of the wear pad. This feature becomes of greater importance where the wear pads are of a substantially greater area than the base of the pistons. It should also be noted that at all times during the wear life of the friction pads I maintain full contact between the pistons and the wear pads while eliminating any fastening between the two. If it is necessary for the piston to rock in the cylinder in order for the wear pad to be in conformity over its entire area with the braking surfaces of the rotating disk, the wear pad and the piston can slide relative to one another to maintain full contact.

Upon release of the operator applied pressure retractor springs 82 will return the wear pads and pistons to a retracted position a sufficient distance from the braking surfaces of the disk to prevent drag and excessive wear.

When the friction pads 72 have become sufficiently worn so that replacement is required, all that is necessary in order to withdraw the friction pads from the brake assembly is to remove the retractor springs 82, loosen the bolts 36 and axially withdraw them a sufficient distance to permit the wear pads to be disengaged therefrom. The withdraw of the wear pads is done in a circumferential direction by grasping their ends. It should be noted that the withdrawal of the bolts 36 does not disturb the assembled condition of the brake elements, particularly all of the fluid connections, which remain undisturbed during servicing of the wear pads. The withdrawal of the wear pads is further facilitated since there is no fastening between the wear pads and the piston, the wear pads merely sliding on the flat surfaces of the pistons when they are withdrawn. New wear pads can obviously be replaced by merely inserting them circumferentially between the caliper limbs and the disk aligning the holes 78 in the backing plates 74 with the extended portions 80 of the bolts 36.

Although only one brake construction has been shown embodying the principles in my invention, it will be appreciated that this construction is merely illustrative of my invention and that the principles thereof can be incorporated into various other types of construction.

It is intended that such revisions and variations of the invention as are reasonably expected on the part of those skilled in the art will be included within the scope of the following claims.

I claim:

1. In a brake having readily serviceable brake members a rotatable disk, a supporting member straddling a periphery of said disk and extending circumferentially over a portion of the surfaces of said disk, a fluid motor housing provided with a cylinder bore and secured to said supporting member one on each side of said disk, a piston received in each of said cylinder bores, said pistons each having a relatively narrow land bearing on the cylinder walls to permit angular movement thereof relative to the piston axis, a wear pad interposed between said disk and said piston and abutting said piston, the abutting surface of said wear pad being flat to permit free movement of said wear pad other than away from the disk whereby conformable contact between said wear pad and disk is maintained while maintaining full area contact between said piston and pad, and anchor members received in said supporting member radially inward from the outer periphery of said rotatable disk and extending toward said disk and through said wear pads to receive the braking torque therefrom, said anchoring members being extractible to allow withdrawal of said wear pads circumferentially from said supporting member and also serving to secure the fluid motor housings to said supporting member.

2. In a brake, a rotatable element, a supporting member for said brake, a wear pad movable into engagement with said rotatable element, relatively fixed and removable anchoring means carried by said supporting member and received through said wear pad to provide closely adjacent said rotatable element anchoring surfaces on which said wear pad is slidably carried, and means for actuating said wear pad, said means including a cylinder and a piston abutting said wear pad and having a relatively narrow land with a diagonal dimension proportioned relatively to said cylinder to provide a limited rocking movement of the piston within its cylinder, the surface of said wear pad abutting the piston being flat to permit withdrawal of said wear pad from said brake upon removal of said anchoring means.

3. In a brake, a rotatable element, a supporting member for said brake, an actuator carried by said supporting member, said actuator including a cylinder and a piston rockable therein, a wear pad movable by said actuator into engagement with said rotatable element, anchoring means for said wear pad mounted rigidly in said supporting member and fixed relatively thereto, said anchoring means being extended towards said rotatable member and through the wear pad to provide closely adjacent said rotatable member anchoring surfaces on which said wear pad is slidably movable, said wear pad having a thrust transmitted connection with said piston providing transverse movement between said wear pad and piston, said anchoring means being disposed to receive substantially all the torque developed from engagement of said wear pad with said rotatable element independently of said piston, said piston and wear pad being relatively movable in a circumferential direction for permitting removal of said wear pad from said brake while maintaining said brake substantially in an assembled condition.

4. A brake comprising a rotatable member having oppositely-facing substantially flat braking surfaces, a stationary supporting member including two limbs one on each side of said rotatable member, and a straddling portion interconnecting said limbs at the outer periphery of said rotor, means for securing the radially inwardly projected end of only one of said limbs to a fixed structure, a fluid motor actuator and housing therefor one on each side of said rotor and each having sections thereof adapted for attaching said fluid motor housing to the outer surface of a respective limb of said supporting member, friction members located between said housings and the braking surfaces of said rotor and movable into frictional engagement with said braking surfaces under pressure from said fluid motor actuators, fastener means extending through said housings and limbs to connect them together, each said fastener means being axially extended through said limbs and friction members to provide anchoring and supporting surfaces for said friction members closely adjacent the braking surfaces of said rotor, said fastener means being retractable for disengagement from said friction members which are proportioned to be removable from their operative position between said rotor and limb while said fluid motor housings are maintained in attachment with the associated limbs.

5. A brake comprising a rotatable member having oppositely-facing braking surfaces, a stationary supporting member including two limbs one on each side of said rotatable member and a straddling portion interconnecting said limbs at the outer periphery of said rotor, means for securing the radially inwardly projected end of only one of said limbs to a fixed structure, a fluid motor actuator and housing therefor one on each side of said rotor and each having sections thereof adapted for attaching said fluid motor housing to a respective limb of said supporting member, friction members located between said housings and the braking surfaces of said rotor and movable into frictional engagement with said braking surfaces under pressure from said fluid motor actuators, fastener means extending through said housings and limbs to connect them together, each said fastener means being axially extended through said limbs and friction members to provide anchoring and supporting surfaces for said friction members closely adjacent the braking surfaces of said rotor and to resist the anchoring torque thereof substantially independently of said housing, said fastener means being retractable for disengagement from said friction members which are proportioned to be removable from their operative position between said rotor and limb while said fluid motor housings are maintained connected with the associated limbs, each said fluid motor housing including a piston in abutment with said friction members to urge the friction members toward the rotor while providing for unimpeded removal thereof when said fastener means are disengaged from said friction members.

6. A brake comprising a rotor with spaced braking surfaces, a support member having limbs extending alongside each said braking surfaces and an interconnecting portion straddling the outer periphery of said rotor and joining said limbs, means for securing the radially inwardly extending portion of one of said limbs to a fixed structure, two fluid motor actuators each including an axially extending cylinder, a piston slidably movable in cylinder bores formed within said cylinders, mounting means constructed integrally with each said cylinders, rigidly fixed fastening devices extending axially through said mounting means to removably clamp said actuators to a respective limb, friction members one one each side of said rotor and engageable with the braking surface thereof under the biasing effort of its associated actuator, and extensions formed on each of said fastening devices and projecting toward the braking surfaces of said rotor to provide anchoring and slidable bearing surfaces for said friction members in fixed axial position closely adjacent said rotor braking surfaces.

7. A brake comprising a rotor with spaced braking surfaces, a support member having limbs extending alongside each said braking surfaces and an interconnecting portion straddling the outer periphery of said rotor and joining said limbs, means for securing the radially inwardly extended portion of one of said limbs to a fixed structure, two fluid motor actuators each including an axially extending cylinder fitted through openings in said limbs, pistons slidably received in cylinder bores formed within said cylinders, mounting means constructed integrally with each said cylinders, axially adjustable fastening devices extending through said mounting means to removably clamp said actuators to a respective limb, friction members one on each side of said rotor and engageable with the braking surface thereof under the biasing effort of its associated actuator, extensions on each of said fastening devices projecting toward the braking surfaces of said rotor to provide anchoring and slidable bearing surfaces for said friction members in fixed axial position closely adjacent said rotor braking surfaces, and resilient means fastened between said friction members and limbs to yieldably retract said friction members from engagement with the braking surfaces of said rotor.

8. A brake comprising a rotor with spaced braking surfaces, a support member having limbs extending alongside each said braking surfaces and an interconnecting portion straddling the outer periphery of said rotor and joining said limbs, means for securing the radially inwardly extended portion of one of said limbs to a fixed structure, two fluid motor actuators each including an axially extending cylinder, pistons slidably movable in cylinder bores formed within said cylinders, mounting means constructed integrally with each said cylinders, axially fixed fastening devices rigidly secured to the respective limbs of said mounting means to removably clamp said actuators to the limbs of said support member, friction members each comprising a friction material faced backing and located one on each side of said rotor and engageable with the braking surface thereof under the biasing effort of its associated actuator, axially extending portions of said fastening devices projecting in the region between said limbs and rotor toward the braking surfaces of said rotor to provide anchoring and slidable bearing surfaces for said friction members in fixed axial position closely adjacent said rotor braking surfaces.

9. The brake structure in accordance with claim 8 wherein said piston is provide with an annular forward end of substantially less area then friction member and abutting thereagainst, and a land bearing surface between said piston and cylinder bore providing swiveling movement of said piston as said friction member conforms with the opposing friction surface of the rotor.

10. For use in cooperation with a rotatable disk member, a braking device comprising a supporting member straddling and extending circumferentially over a portion of the surfaces of said disk member, said supporting member providing supporting limbs one on each side of said disk member and which are axially removed from said disk member to provide open spaces therebetween, wear pads operatively positioned in said open spaces, actuators to apply said wear pads against said disk member, and anchor members extending transversely through said limbs and said friction members, said anchor members being disposed radially inwardly from the outer periphery of said rotatable member and having end portions terminating closely adjacent said disk member to provide surfaces slidably supporting said wear pads which anchor thereagainst, said anchor members being axially retractable to provide circumferential withdrawal of said wear pads from said device while maintaining the supporting limbs and anchoring surfaces in assembled relation.

11. In a brake, a rotor, a supporting member having at least one limb extending along one side of said rotor but spaced axially therefrom, a fluid actuator including a piston and cylinder carried by said supporting member, said piston having a relatively narrow land portion of its periphery closely fitted within the cylinder, the diagonal dimensions across the diameter of said narrow land portion being less than the cylinder diameter to provide angular movement of said piston within said cylinder, a wear pad operatively engaged by said piston and movable thereby in an axial direction to frictionally engage said rotor, said wear pad being proportioned to fit within the space provided between said limb and rotor and removable circumferentially relatively to the limb and rotor, and anchoring means for said wear pad providing spaced bearing surfaces for the spaced ends of said friction member which are free to advance one end relatively to the other towards said rotor, said anchoring means being displaceable axially relatively to the rotor surfaces to effect disengagement of said anchoring means and wear pads whereby the wear pads are withdrawn circumferentially of said brake.

12. In a brake, a rotor, a supporting member, a fluid actuator including a piston and cylinder carried by supporting member, said piston having a relatively narrow land portion contacting said cylinder, said narrow portion being rounded to provide angular movement of said piston within said cylinder, whereby said piston and wear pad may move relative to said piston in a direction normal to the piston axis while maintaining full contact between said piston and wear pad, and anchoring means for said wear pads, said anchoring means for said wear pads having bearing surfaces in engagement with said wear pads and which provide for movement of the portions of said wear pad on its respective bearing surfaces one end of said friction member relatively to the other, said anchoring means being axially movable for effecting disengagement of the bearing surfaces of said anchor with said wear pad for removal of the wear pads circumferentially of said brake.

References Cited in the file of this patent

UNITED STATES PATENTS

| | | |
|---|---|---|
| 2,182,386 | Patterson | Dec. 5, 1939 |
| 2,238,943 | McCune et al. | Apr. 22, 1941 |
| 2,548,008 | Franklin | Apr. 10, 1951 |
| 2,667,947 | Lucien | Feb. 2, 1954 |
| 2,754,936 | Butler | July 17, 1956 |
| 2,840,193 | Mann et al. | June 24, 1958 |

FOREIGN PATENTS

| | | |
|---|---|---|
| 1,105,308 | France | Nov. 29, 1955 |
| 717,350 | Great Britain | Oct. 27, 1954 |
| 738,545 | Great Britain | Oct. 12, 1955 |
| 742,338 | Great Britain | Dec. 21, 1955 |
| 747,972 | Great Britain | Apr. 18, 1956 |

UNITED STATES PATENT OFFICE
CERTIFICATE OF CORRECTION

Patent No. 2,994,410                            August 1, 1961

Richard T. Burnett

It is hereby certified that error appears in the above numbered patent requiring correction and that the said Letters Patent should read as corrected below.

Column 5, line 3, for "transmitted" read -- transmittal --; column 6, line 57, for "provide" read -- provided --.

Signed and sealed this 1st day of May 1962.

(SEAL)
Attest:

ERNEST W. SWIDER
Attesting Officer

DAVID L. LADD
Commissioner of Patents